United States Patent
Farrelly

(10) Patent No.: US 10,913,489 B2
(45) Date of Patent: Feb. 9, 2021

(54) ELECTRIC POWER STEERING SYSTEM

(71) Applicant: TRW Limited, Solihull (GB)

(72) Inventor: James Owen Patrick Farrelly, Kenilworth (GB)

(73) Assignee: ZF Automotive UK Limited

( * ) Notice: Subject to any disclaimer, the term of this patent is extended or adjusted under 35 U.S.C. 154(b) by 0 days.

(21) Appl. No.: 16/461,571

(22) PCT Filed: Nov. 16, 2017

(86) PCT No.: PCT/GB2017/053450
§ 371 (c)(1),
(2) Date: May 16, 2019

(87) PCT Pub. No.: WO2018/091898
PCT Pub. Date: May 24, 2018

(65) Prior Publication Data
US 2020/0062301 A1    Feb. 27, 2020

(30) Foreign Application Priority Data
Nov. 17, 2016 (GB) .................................. 1619479.7

(51) Int. Cl.
B62D 5/04       (2006.01)
H02P 6/08       (2016.01)
B62D 15/02      (2006.01)

(52) U.S. Cl.
CPC ......... B62D 5/0493 (2013.01); B62D 5/0409 (2013.01); B62D 5/0463 (2013.01);
(Continued)

(58) Field of Classification Search
CPC .. B62D 5/0493; B62D 5/0463; B62D 5/0409; B62D 15/0215; B62D 5/005; B62D 6/10; H02P 2205/05
See application file for complete search history.

(56) References Cited

U.S. PATENT DOCUMENTS 6,148,949 A * 11/2000 Kobayashi ........... B62D 5/0463
                                                      180/404
6,597,141 B1 *  7/2003 Wilson-Jones ....... B62D 5/046
                                                      318/560
(Continued)

FOREIGN PATENT DOCUMENTS

DE    102009005836 A1    7/2010
JP    WO2016047284 A1    4/2017
(Continued)

OTHER PUBLICATIONS

Patents Act 1977: Search Report under Section 17(5), Application No. GB1619479.7, dated May 10, 2017.

Primary Examiner — Bickey Dhakal
(74) Attorney, Agent, or Firm — Gigette M. Bejin

(57) ABSTRACT

An electric power assisted steering apparatus comprises an upper column shaft that is connected to a steering wheel of the vehicle; and a lower column shaft. A torsion bar interconnects the upper column shaft and the lower column shaft; and an electric motor is connected to the lower column shaft of the torque sensor assembly. A first sensor circuit generates a first torque signal based on angular deflection of the torsion bar, and a second sensor circuit generating a second torque signal based on angular deflection of the torsion bar, the apparatus further including: an error determining circuit which produces two error signals, each indicative of the validity of a respective torque signal, and a torque plausibility estimator which generates two plausibility signals each indicative of the plausibility of a respective one of the two torque signals.

12 Claims, 5 Drawing Sheets

(52) U.S. Cl.
CPC ............ *B62D 5/0484* (2013.01); *H02P 6/085* (2013.01); *B62D 15/0215* (2013.01); *H02P 2205/05* (2013.01)

(56) References Cited

U.S. PATENT DOCUMENTS

| | | | |
|---|---|---|---|
| 2003/0114969 A1* | 6/2003 | Dominke | B62D 5/0493 |
| | | | 701/41 |
| 2003/0233181 A1 | 12/2003 | Colosky | |
| 2014/0277944 A1* | 9/2014 | Bean | B62D 6/002 |
| | | | 701/41 |
| 2015/0046036 A1 | 2/2015 | Sasaki et al. | |
| 2016/0200353 A1 | 7/2016 | Sasaki et al. | |
| 2016/0229445 A1* | 8/2016 | Sasaki | B62D 5/0484 |

FOREIGN PATENT DOCUMENTS

| | | | |
|---|---|---|---|
| WO | 2015198035 A1 | 12/2015 | |
| WO | 2015198037 A1 | 12/2015 | |

* cited by examiner

ELECTRIC POWER STEERING SYSTEM

CROSS-REFERENCE TO RELATED APPLICATIONS

This application is a national stage of International Application No. PCT/GB2017/053450, filed 16 Nov. 2017, the disclosures of which are incorporated herein by reference in entirety, and which claimed priority to Great Britain Patent Application. No. 1619479.7, filed 17 Nov. 2016, the disclosures of which are incorporated herein by reference in entirety.

BACKGROUND TO THE INVENTION

This invention relates to improvements in electrical power assisted steering systems.

In a typical electric power assisted steering system, an electric motor, such as a three phase DC electric motor, is connected to a part of the steering mechanism, typically to the steering shaft that connects the steering wheel of the vehicle to the road wheels. A sensor, such as a torque sensor, produces a signal indicative of the torque applied to the steering wheel by the driver, and this signal is fed into a microprocessor which generates a control signal for the motor. The microprocessor produces control signals for the motor which are indicative of the torque or current that is required from the motor as a function of the torque applied to the steering wheel. These control signals are converted into voltage waveforms for each phase of the motor within the microprocessor, and these in turn are transmitted from the microprocessor to a motor bridge driver.

The motor bridge driver converts the control signals, which are typically low level voltage waveforms, into higher level voltage drive signals that are applied to the respective phases of a motor bridge. A typical bridge comprises a set of switches that selectively apply current from a supply to the phases of the motor as a function of the high level voltage drive signals applied to the switches from the bridge driver circuit. By controlling the switches the current in the motor can be controlled relative to the motor rotor position, allowing the torque produced by the motor to be controlled. The motor in use is thereby caused to apply an assistance torque to the steering system that helps, or assists, the driver in turning of the steering wheel. Because this torque affects the output of the torque sensor, this forms a type of closed loop control allowing accurate control of the motor torque to be achieved.

The torque sensor typically comprises a torsion bar and two angular position sensors, one of which provides an output signal representing the angular position of the steering system on one side of the torsion bar and the other an output signal representing the angular position of the steering system on the other side of the torsion bar. When no torque is applied, the two output signals will be in alignment, but as a torque is applied the torsion bar twists causing the two angular position sensors to move out of alignment. This relative change in the output signals provides the measurement of torque needed.

To provide additional margin of safety in the event of a fault it is known to use a dual channel torque sensor, which produces two channels of information that each respectively provide a torque measurement. In use, the torque indicated by each channel is checked against the other and if they are in agreement it can be assumed that the torque value is reliable. If they are not in agreement, one or both channels may be faulty and an error flag can be raised. Typically, when this happens, the assistance torque is not applied by the motor Although dual channel torque sensors give increased safety it is not possible to continue to safely apply assistance torque if one channel is faulty even if the other is not, partly because it may not be possible to tell which channel is faulty and which is reliable if both signals differ but are within a normal range as each signal is equally plausible.

SUMMARY OF THE INVENTION

According to a first aspect the invention provides an electric power assisted steering apparatus comprising an upper column shaft that in use is operatively connected to a steering wheel of the vehicle; a lower column shaft that in use is operatively connected to the road wheels of the vehicle; a torsion bar that interconnects the upper column shaft and the lower column shaft; an electric motor that is connected to the lower column shaft of the torque sensor assembly so that a change in the angular position of the motor produces a corresponding change in the angular position of the output shaft and the relative angular positions are unaffected by torsion carried by the torsion bar; a first torque signal generating means generating a first torque signal based on angular deflection of the torsion bar, and a second torque signal generating means generating a second torque signal based on angular deflection of the torsion bar, the apparatus further including an error determining circuit which in use produces two error signals, each indicative of the validity of a respective torque signal, and additionally including a torque plausibility estimator which in use generates two plausibility signals each indicative of the plausibility of a respective one of the two torque signals, a torque channel selector that observes the value of the two error signals and the two plausibility signals and based on the value of those signals selects which, if any, of the torque signals are to be used in the generation of a control signal for the motor, and a motor control circuit which generates the control signal dependent on the values of the selected torque signal or torque signals.

The motor control circuit may be adapted to generate a control signal having a value which is dependent upon an average of the first and second torque signals, if both the first and second torque signals are selected by the torque channel selector observing that they are consistent with each other.

The motor control circuit may also be adapted to generate a control signal having a value which is dependent upon the value of the first torque signal, if the first and second control signals are not consistent with each other and only the first control signal is observed to be plausible.

The motor control circuit may be adapted to generate a control signal having a value which is dependent upon the value of the second torque signal, if the first and second control signals are not consistent with each other and only the second control signal is plausible.

Finally, the motor control circuit may be adapted to generate a control signal having a value of zero or indicative of an error, if the torque channel selector Observes that the first and second torque signals are neither consistent with each other nor plausible.

The error determining circuit for the first channel may indicate that the torque output signal is in error when the value of the torque output signal is detected to be either absent or out of a predetermined range of expected values. Similarly the error determining circuit for the second channel may indicate that the torque output signal is in error when the value of the torque output signal from the second channel is detected to be either absent or out of range of expected values.

The channel selector may in use only select a channel when the plausibility of the channel is observed to be plausible and there is no torque channel error for that channel.

The plausibility estimator for each torque signal generating means may determine that a torque signal is plausible by observing one or more additional signals obtained from a part of the torque sensor or from one or more additional sensors that monitor a part of the steering system.

In one arrangement, the apparatus may include a secondary means for determining the torque that is independent, or partially independent, of the two torque channels and the plausibility estimator may be arranged to determine the plausibility of a torque signal by comparing the torque signal with the torque estimated by the secondary means.

The apparatus may additionally include a crosscheck diagnostic generating means that produces a crosscheck signal indicative of any difference between the two torque values, the torque channel selector additionally observing the output of the crosscheck diagnostic channel when selecting which if any of the torque signals is to be selected for use by the motor controller.

The crosscheck diagnostic generating means may generate a crosscheck signal indicating a crosscheck error when the torque signals output from the two torque signal generating means are found to differ by more than a predetermined amount (indicating that one torque channel has become divergent).

A motor position sensor may also be provided, the motor position sensor being configured to output a motor position signal indicative of the position of the electric motor, the motor position signal being used by the plausibility circuit to determine the plausibility of the first and second torque signals. The motor position sensor may be used to verify the torque signals, due to its direct correlation with the position of the steering column.

The apparatus may include a first column angle generating means that in use produces a first angular position signal indicative of the angular position of the upper column shaft; and a second column angle generating means that in use produces a second angular position signal indicative of the angular position of the upper column shaft.

The first and second torque signal generating means may comprise comparator circuitry that generates the respective torque signals from comparison of the angular positon of the two ends of the torsion bar as indicated respectively by the first and second angular position sensing means.

The apparatus may check the integrity of the first and second column angle generating means, and only if this check is passed may the associated torque signal be indicated as plausible.

Each of the secondary torque signal generating means, where provided, may generate an estimate of torque based on the motor position and the angular position of the upper shaft from the first or second angular position sensors respectively to determine the angular deflection of the torsion bar.

The apparatus may further comprise a coarse angle sensing means configured to produce a coarse angle signal, the coarse angle signal being combined with each of the first angular position signal and second angular position signal to produce a first absolute angular position signal and a second absolute angular position signal, respectively, the first and second absolute angular position signals, being used by the plausibility circuit to determine the plausibility of the first and second torque signals.

The torque channel plausibility may therefore be confirmed when both of the following diagnostic pass:
  Secondary (Virtual) torque diagnostic (torsion bar deflection as measured by upper column angle and motor angle signal aligns with the torque measured by the torque channel)
  Angle crosscheck diagnostic (upper column angle fine and coarse angle components align, confirming the absence of a torque/fine angle channel common mode failure)

The plausibility circuit may be configured to determine that the first and second torque signals are plausible if a corresponding first or second virtual torque error and a corresponding first or second angle error are within a predetermined range.

Having a predetermined, allowable, range for the error signals ensures that some sensor drift or tolerance allowed for, whilst ensuring that the signals are still accurate enough for the desired purpose.

The processing means may be adapted to calculate the first and second virtual torque error from the first angular position signal and the motor angle signal, and the second angular position signal and the motor angle signal, respectively.

Furthermore, the processing means may be adapted to calculate the first and second angle error from the first angular position signal and the course angle signal, and the second angular position signal and the motor angle signal, respectively.

The first and second torque signal generating circuits may each have a separate power supply, harness, and/or communications interface. By providing such an arrangement, it prevents failure of a single one of the power supply, harness, or communications interface from resulting in the absence or error or both the torque signals.

The signals output from the sensors may be transmitted using a single edge nibble transmission (SENT) protocol to a signal processing circuit which determines the plausibility and error in the signals and selects which torque signal or signals to pass on to the motor controller. SENT provides a high enough number of communication channels in order to provide completely separate channels for all of the required signals. Thus, the first and second torque channels and the signals used to determine the plausibility of these signals can be kept separate enough to allow failure of one set whilst still allowing the output of control signals to the electric motor.

Other advantages of this invention will become apparent to those skilled in the art from the following detailed description of the preferred embodiments, when read in light of the accompanying drawings.

DETAILED DESCRIPTION OF THE INVENTION

Figure 1:
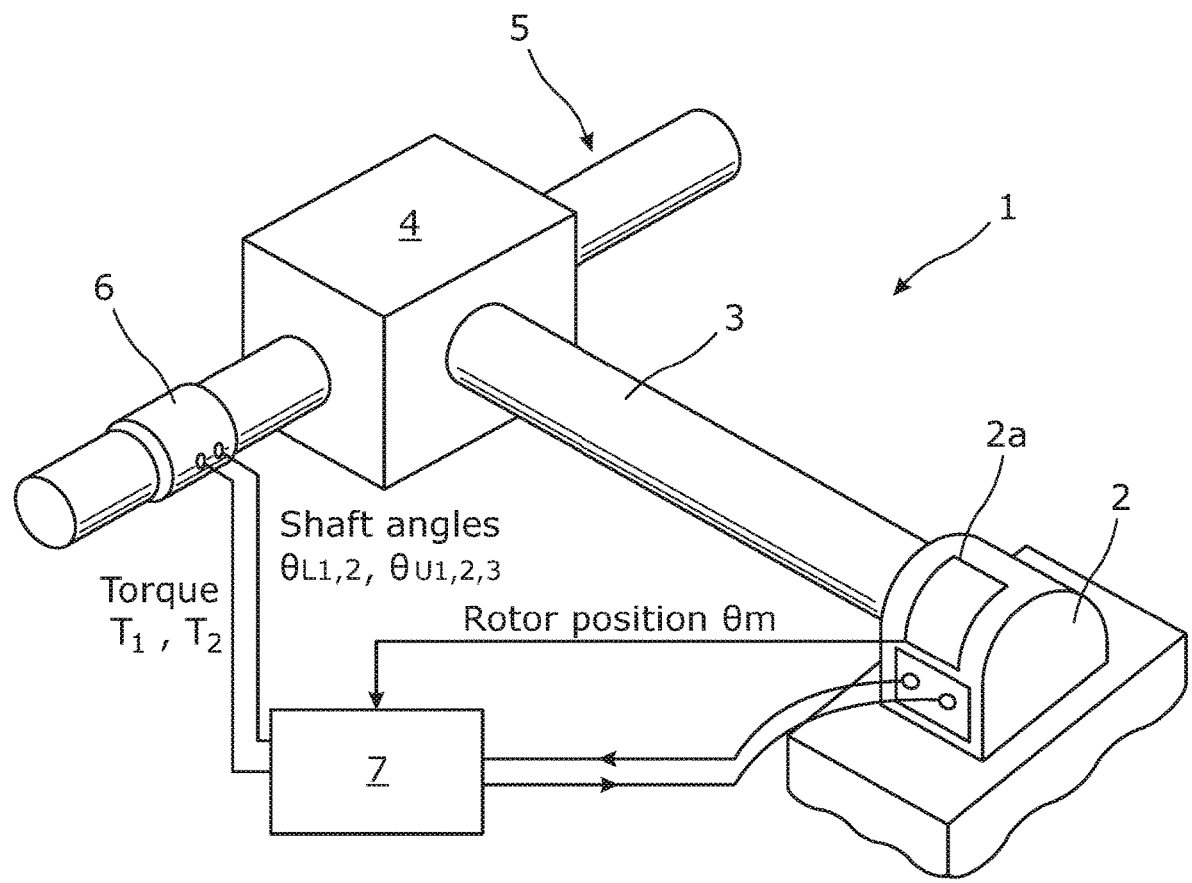
FIG. 1 is a general view of a part of an electric power assisted steering system which falls within the scope of the present invention.

As shown in FIG. 1, an electric power assisted steering system 1 is located within a steering apparatus between the steering wheel and the road wheels. The system comprises an electric motor 2 which has an output shaft 3 that is connected to a lower steering column shaft by a gearbox 4, usually comprising a worm gear that cooperates with a wheel gear. The lower column shaft is connected to the road wheels of the vehicle indirectly through a rack and pinion or other connection. An upper column shaft supports the steering wheel, and connecting the upper column shaft to the lower column shaft is a torque sensor 6. The torque sensors comprises a torsion bar that connects the upper and lower column shafts, designed to twist by a known amount in response to a torque applied across the torsion bar as the driver turns the steering wheel. The maximum twist is limited by providing dog stops on the upper and lower column shafts to ±5 degrees.

The torque sensor detects the twist of the torsion bar and converts this into at least one torque signal although, as will become apparent, it produces two torque signal, these torque signals being fed to a motor control circuit in the form of a micro-controller 7 of a motor drive circuit that is provided within a microprocessor chip. The controller produces motor phase voltages that are applied to the switches of a motor bridge associated with each phase of the motor to cause the motor to produce a torque that assists the driver. This is usually proportional to the measured torque, so that as the driver applies a higher torque the motor provides a higher amount of assistance to help turn the wheel.

Figure 2:
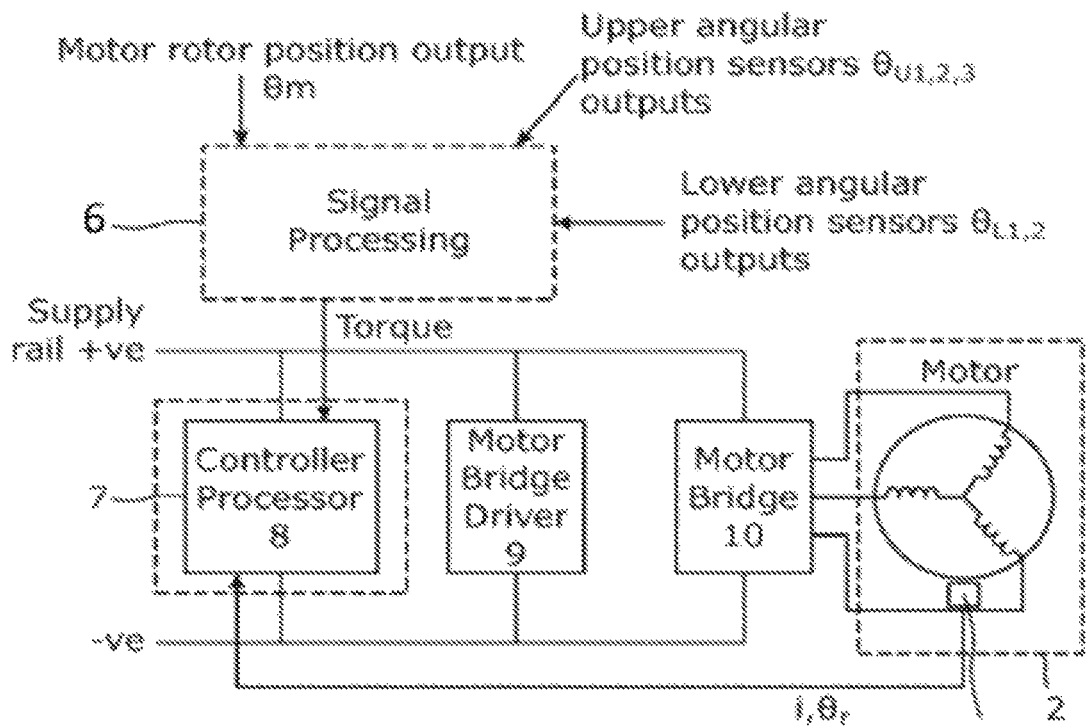
FIG. 2 is a block diagram of the key parts of an electrical circuit of the system of FIG. 1.

As shown in FIG. 2, the controller comprises a microprocessor 8 that receives a selected torque signal or signals and a measure of the current i flowing in the motor (either in each phase or the overall current into or out of the motor). It also receives a measure of the motor rotor position from a motor rotor angular position sensor connected to the motor, or it calculates this internally from the current signals. The rotor position together with current allows the controller to determine the torque that is being applied. The measure of the torque from the torque sensors is used by the controller to determine what torque it is to demand from the motor. Again this is well known in the art, and many different control strategies and motor phase voltage waveforms to achieve the required torque have been proposed in the art. In the embodiment described below, the value of the torque applied by the driver that is used by the controller is carefully selected by observing the torque signal generated by two torque channels and also signals that indicate if one or both values are in error, are implausible or differ in value.

The output of the microprocessor 8 will typically be a set of motor phase voltage waveforms, typically PWM waveforms that represent the phase voltages that are required by the controller to achieve the desired motor current and hence motor torque. These are low level signals, and are fed from the controller to the inputs of a motor bridge circuit 9. The function of the motor bridge circuit 9 is to turn the low level signals into the higher level drive signals for the switches of a motor bridge 10. For instance with a three phase motor each phase will be connected to the positive supply through a high switch and the ground through a low switch, only one of which will be connected at any given time according to the pattern defined by the PWM switching waveforms.

Figure 3:
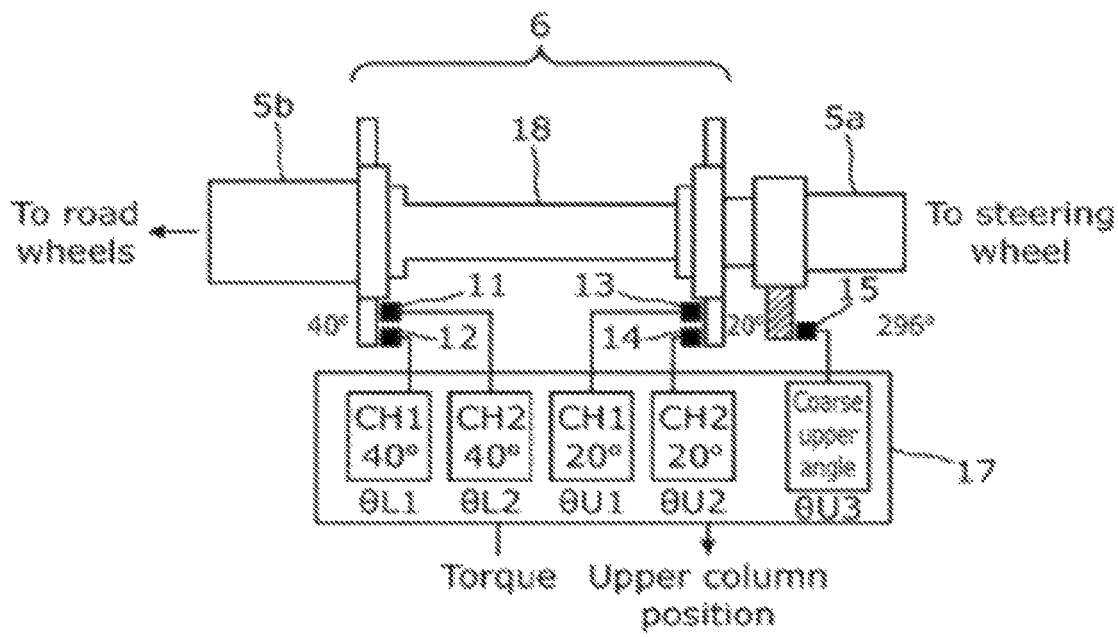
FIG. 3 shows the key components of a combined torque and angular position sensor used within the system of FIG. 1.
Figure 4:
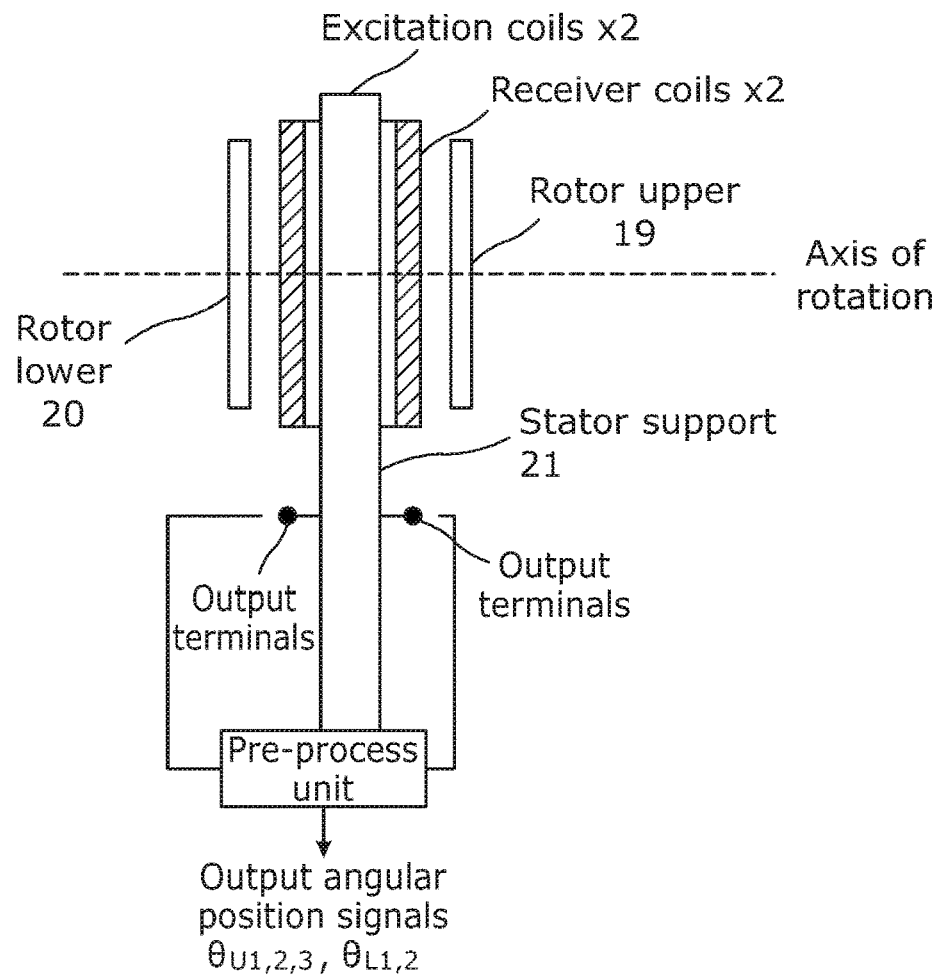
FIG. 4 is a general view of the mechanical arrangement of the sensor of FIG. 3.
Figure 5:
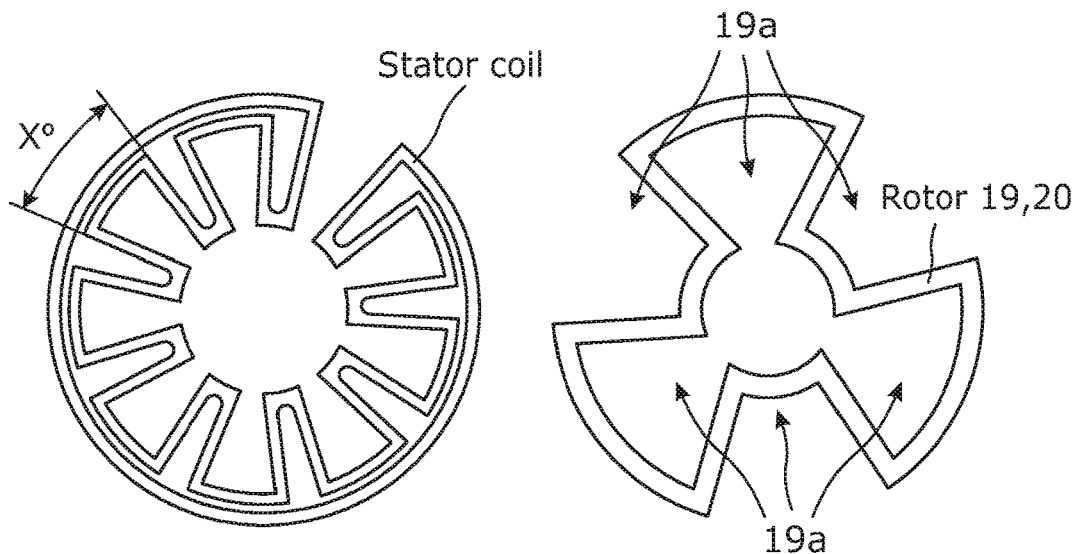
FIG. 5 shows in e detail one arrangement of the sensing electronics of the sensor of FIG. 4.

FIG. 3 shows an exemplary torque sensor assembly in more detail and FIGS. 4 and 5 show still more detail of parts of the sensor. In its most generic form the torque sensor can be any arrangement that produces two torque channels and each having a corresponding upper column position signal. Ideally, these two torque channels and also the upper column position signal should be independent from each other.

In this example a sensor has been selected that comprises a combined two channel torque and two channel upper column position sensor having a total of five sensors 11,12, 13,14 and 15 combined in a single integrated unit with a common pre-processing unit that produces the sensor output signals from raw internal signals from the sensors. Three of the sensors are located on an upper column shaft 5a and two on a lower column shaft 5b, the two shafts being connected by a torsion bar 18 that twists as torque is applied across the shaft 5.

The five sensors comprise:
two fine angle upper column angular position sensors 13,14 attached to the upper column shaft end of the torsion bar and each producing an independent angular position signal (channel 1 signal and channel 2 signal) that together form a part of an upper column sensing means;
two fine angle lower column angular position sensors 11,12 attached to the lower column shaft end of the torsion bar closest to the motor and each producing an independent angular position signal (channel 1 and channel 2 signal) that together form a lower column sensing means; and
a secondary upper column position sensor 15 that produces a coarse resolution angular position signal and which can be considered a further part of the upper column sensing means.

A processor 17 uses a subtraction principle to detect twist in the torsion bar, subtracting the position of the lower column shaft from that of the upper column shaft (or vice versa) to determine an angular deflection value for the torsion bar. This is done twice, once for the upper and lower channel 1 signals, and again for the upper and lower channel 2 signals to give two independent torque measurements or torque channels.

The torsion bar 18 is designed to twist through a maximum of ±5 degrees about a centre position in response to a maximum expected torque in each direction as described above. Once this range has been reached further twisting is prevented by the inter-engagement of the dog stops on the upper and lower column shafts, saving the torsion bar from damage and giving a solid connection should the torsion bar ever fail.

Each of the angular position sensing means includes a respective metal rotor 19, 20 comprising a flat metal disk having a plurality of equally spaced radial arms forming an annular track of cut-outs 19a that extends around the disk. There are therefore two disks in total, one on the lower column shaft and one on the upper column shaft. The relevant parts of an exemplary sensor assembly are shown in FIGS. 4 and 5 of the drawings.

The angular width of each cut-out is equal to the angular spacing between each cut-out. The spacing of the cut-outs of the lower column shaft rotor is 40 degrees and the upper is 20 degrees. In the example rotor and stator of FIG. 5 the angle is set by the spacing between the radial arms of the coils, and this will differ for the upper and lower sensors. They differ due to physical constraints in the manufacture of the particular sensor assembly are in some ways are unique to this described embodiment. Indeed it would be preferred if they were both 40 degrees or more in periodicity.

Each rotor 19, 20 cooperates with a stator support part 21 that comprises a printed circuit board (PCB) to form two angular position sensors. The board 21 carries the active parts of the sensing means comprising two excitation coils and two sets of receiver coils, one excitation coil and one set of receiver coils forming each of the two sensors. The excitation coil of each sensor forms part of an LC circuit and generates a magnetic field. This field induces a current in the metal rotor and in turn the rotor generates its own magnetic field that couples back to the respective receiver coils of that sensor on the PCB. The induced voltages in each of the three receivers varies according to the rotor position and the pre-processing unit of the sensor assembly converts the three signals into an output signal for the sensor that varies linearly with rotor position. As the rotor rotates each of the angular position signals will vary linearly with a periodicity of 40 degrees for the lower rotor and 20 degrees for the upper rotor. The output signals therefore repeat many times during a complete revolution of the upper column shaft and so on their own do not provide an indication of the absolute position of the shaft over the full range of movement of the upper column shaft which is typically between 3 and 4 turns lock to lock of the steering wheel.

Figure 6:
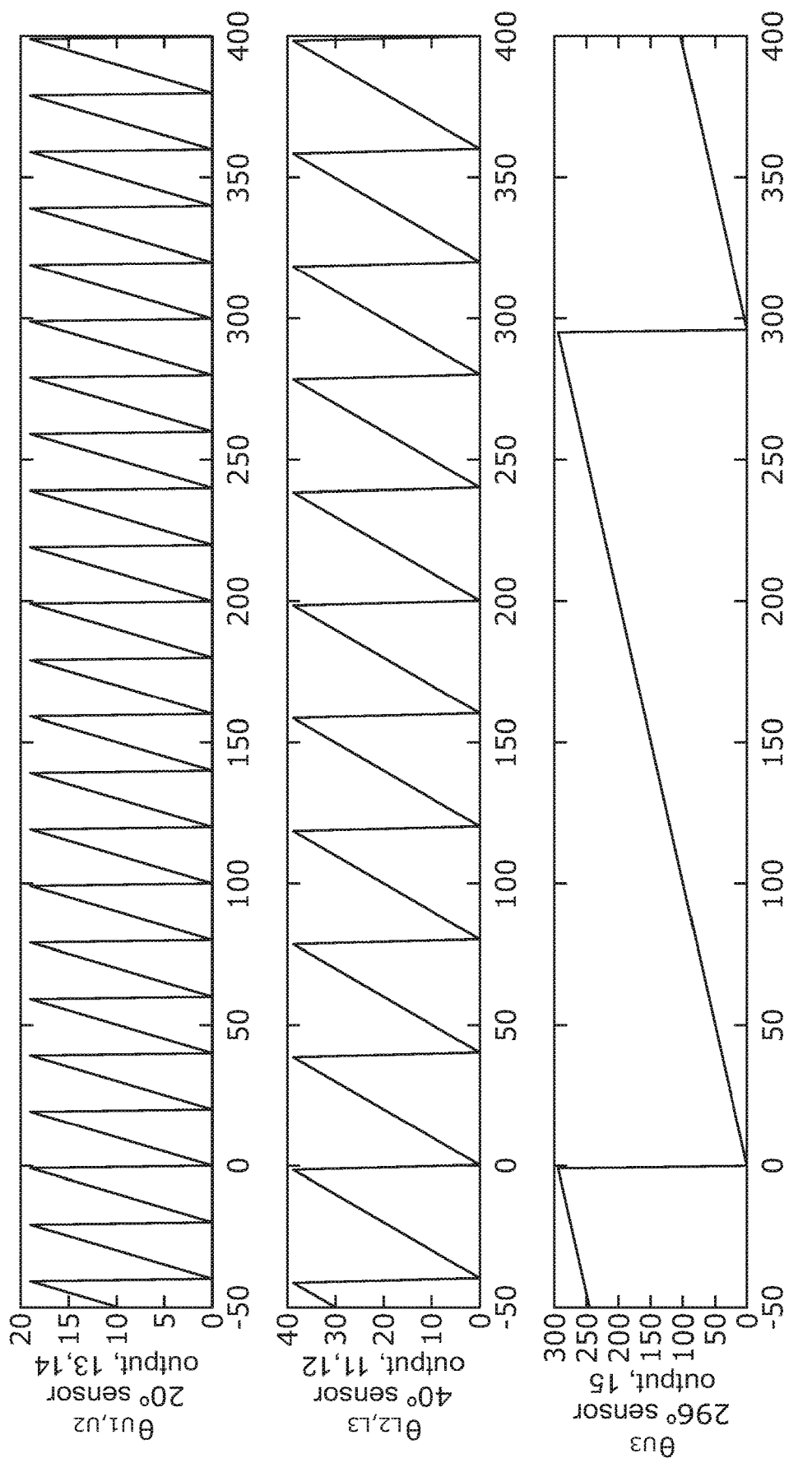
FIG. 6(a) to (b) show the variation in the output signals of the sensor of FIG. 3.

FIGS. 6(*a*) and (*b*) shows how the output signal from the upper and lower sensor output signals vary over one full rotation of the steering shaft in the case where no torque is applied. As can be seen each varies linearly over 20 or 40 degrees before repeating. If a torque is applied the relative phase of these ramp signals will vary and this is what is used to determine the torque. The maximum twist of the torsion bar is considerably less than 20 degrees so there will always be an unambiguous phase change between the ramps that can be detected. This form of differential measurement across two sensors is well known in the art and so will not be explained further here.

In order that the signals can provide an indication of the absolute position of the shaft, as well as the twist of the torsion bar, a secondary sensor is provided. The secondary sensor is connected to the upper column shaft through a gear wheel. This can be seen in FIG. 3. This sensor 15 has a much lower periodicity than either of the upper and lower column sensors and, in this example, outputs a linearly varying signal that repeats every 296 degrees of rotation of the upper shaft. This is shown in FIG. 6(*c*). It comprises a single magnet with a north and south pole that rotates past a single Hall Effect sensor, giving a ramped waveform that varies through one cycle over the 296 degrees. The signal is a "coarse" signal because for a given level of bits in the digital signal it must cover all the values from 0 to 296. By comparison, for the 20 degree sensor it is a "fine" signal because the bits in the digital signal must cover a small range of angles, e.g. more than 10 times the angular resolution for a given number of bits in the digital signal.

To get the absolute column position the processor may process the value of the secondary sensor output signal, repeating every 296 degrees, with that of the 20 degree or 40 degree sensor. In this example, it processes it with a modified form of the channel 1 signal from the lower column sensor, modified to remove the effect of twist of the torsion bar to form a "virtual upper column position signal" that repeats every 40 degrees of rotation. This comparison enables a unique angular position signal for the upper column to be produced that repeats every 1480 degrees (since this is the angle of rotation before the pairing of values of the secondary sensor and virtual upper column signal).

Figure 7:
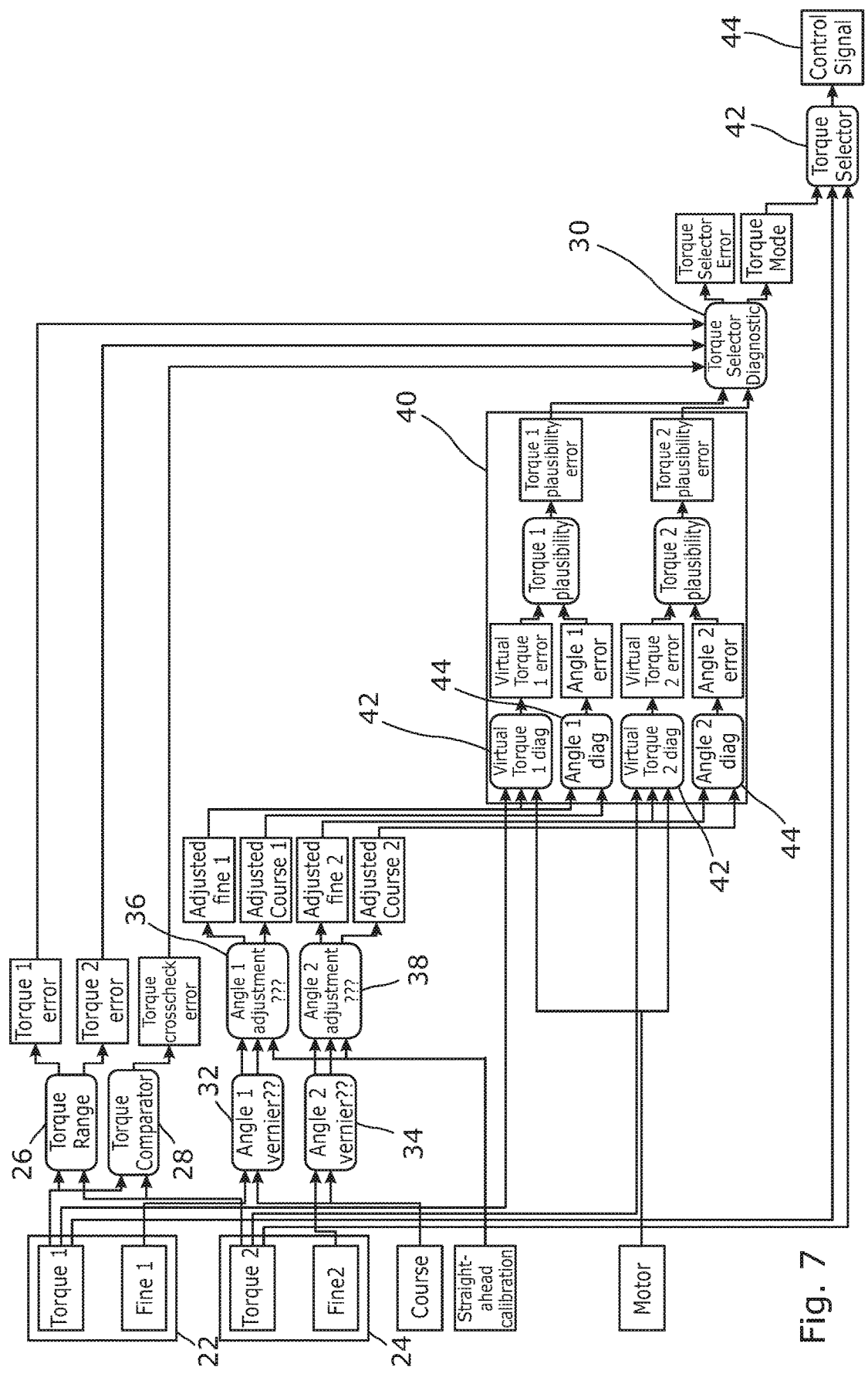
FIG. 7 is a schematic diagram of the logic used by the processing means, in accordance with the invention.

The channel 1 torque signal T1 and angular position signals (upper and lower), referred to as the first sensor circuit 22, and the channel 2 torque signal T2 and angular position signals (upper and lower), referred to as the second sensor circuit 24, are used as inputs to a processing circuit 19, shown in FIG. 2 and in more detail in FIG. 7, which outputs a selected torque signal or signals that are fed to the motor controller 8. The function and construction of the processing circuit will now be explained.

In a first part of the circuit, each of the channel 1 and 2 torque signals are input to a range-checking (error checking) circuit 26 and into a cross checker circuit 28. The range-checking circuit 26 checks that each torque signal is within the allowable range of values. If either is outside of this range, and therefore deemed to be unreliable, an error signal related to the unreliable torque signal is output to a torque selector diagnostic circuit 30. The cross checker circuit 28 compares the two torque signals from the two channels. If the channel 1 torque signal, T1, and channel 2 torque signal, T2, differ by more than a predetermined amount then a signal indicating an error in one of the torque signals is output to the torque selector diagnostic circuit 30. However, the cross checker circuit 28 alone is not able to indicate which torque signal, if any, is in error.

In order to determine whether the outputs of the first and second sensor circuits 22, 24 are plausible, they are each subjected to further processing in the form of a plausibility circuit 40. In the present embodiment, the plausibility circuit 40 comprises a virtual torque diagnostic circuit 42 and an angle diagnostic circuit 44 for each torque channel.

Considering first each virtual torque diagnostic circuit, these take as inputs an upper column position signal and a motor position signal. The motor position signal is generated through a motor position sensor from which an absolute position of the motor is found. A full description of the workings of the motor position sensor, and the generation of a virtual torque signal can be found in the applicant's published international patent application WO 2015/198037.

In brief, by combining the motor position signal with an upper column position signal, a second (virtual) torque signal can be produced in the same way as each of the channel 1 and channel 2 torque signals are produced, but by using the motor position signal in place of the lower column position signal since the motor positon will give an indication of the angular positon of the lower end of the torsion bar. A virtual torque signal is therefore produced which corresponds to either channel 1 or channel 2, depending on which upper column position signal is used.

An angle error signal is also produced for each channel to indicate whether the angle signals output from the angular positon sensors are in error.

Each virtual torque signal is then compared to its respective torque signal and a respective virtual torque error signal determined. The virtual torque error signals obtained from the comparisons of the virtual torque signals and torque signals, produced by the virtual torque diagnostic circuits 42, and the angle error signals, produced by the angle diagnostic circuits 44, are then processed. If these error signals are within an allowable range then the plausibility circuit 40 will output that the torque signal value for the respective channel is plausible, this output being fed to the torque selector diagnostic circuit 30. If any of the error signals are larger than a predetermined allowable amount then the plausibility circuit 40 will indicate that the respective torque signals are not plausible.

The torque selector diagnostic circuit 30 observes the signals received from the range-checker circuit 26, comparator circuit 28, and the plausibility circuit 40 and, from these signals, determines a torque mode which should be selected by a torque selector 42. The torque selector then receives the channel 1 and channel 2 torque signal for processing, along with the selected torque mode and outputs a control signal 44 to the electric motor 2 which is indicative of the required torque.

In the present embodiment, the torque selector 42 is capable of operating in four different modes, dependent on the output of the torque selector diagnostic circuit 30 set out in the table below:

| Torque selector mode | Torque selector signal | Torque selector error indicated | Conditions |
|---|---|---|---|
| Both channels selected | Average of torque 1 and torque 2 | No | (T1 and T2 both present and in range) AND ((T1 and T2 consistent)OR(T1 and T2 plausible)) |
| Channel 1 selected | Torque 1 | No | (T1 present and in range) AND (T1 plausible) |
| Channel 2 selected | Torque 2 | No | (T2 present and in range) AND (T2 plausible) |
| No channel selected | 0Nm | Yes | None of the above |

If both the channel 1 and channel 2 torque signals are determined to be present and in range, then the torque selector 42 is configured to output a control signal indicative of the average torque of the two torque signals. By average, it is meant that the control signal should be the mean of the two signals.

If the channel 1 and channel 2 torque signals are not consistent with each other, the torque selector diagnostic circuit 30 uses the output of the plausibility circuit 40 to determine which of the signals is plausible and therefore reliable. It may also utilise the range-checker circuit 26 output for this purpose. If only the channel 1 torque signal is plausible then the torque selector 42 will be instructed to output a control signal 44 indicative of the channel 1 torque signal, or if only the channel 2 torque signal plausible then the torque selector 42 will be instructed to output a control signal 44 indicative of the channel 2 torque signal. If the channel 1 and channel 2 torque signals are neither consistent with each other nor plausible, then the torque selector 42 will output a control signal indicative of zero torque. Thus, no assistance will be provided to the power-steering system.

As can be seen, it is only when component signals of both of the first and second sensor circuits 22, 24 are considered to be faulty that no assistance torque is provided to the power-steering system. Because of this, the system of the present invention is capable of providing assistance torque in a far greater number of possible failure scenarios than systems of the prior art.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. An electric power assisted steering apparatus comprising:
   an upper column shaft that in use is operatively connected to a steering wheel of a vehicle;
   a lower column shaft that in use is operatively connected to road wheels of the vehicle;
   a torque sensor further including a first sensor circuit, a second sensor circuit, and a torsion bar that interconnects the upper column shaft and the lower column shaft;
   an electric motor that is connected to the lower column shaft so that a change in an angular position of the electric motor produces a corresponding change in the angular position of the lower column shaft and the relative angular positions of the electric motor and the lower column shaft are unaffected by torsion carried by the torsion bar;
   wherein the first sensor circuit is configured to generate a first torque signal based on angular deflection of a first end of the torsion bar, and the second sensor circuit is configured to generate a second torque signal based on angular deflection of a second end of the torsion bar;
   an error determining circuit which in use produces two error signals, each indicative of a validity of a respective torque signal, and a torque plausibility estimator which in use generates two plausibility signals each indicative of the plausibility of a respective one of the two torque signals;
   a torque channel selector that observes a value of the two error signals and the two plausibility signals and based on the value of those signals selects which, if any, of the torque signals are to be used in the generation of a control signal for the electric motor; and
   a motor control circuit which generates the control signal dependent on the values of the selected torque signal or torque signals.

2. The electric power assisted steering apparatus according to claim 1 in which the motor control circuit is adapted to generate a control signal having a value which is dependent upon the value of the first torque signal, if the first and second control torque signals are not consistent with each other and only the first control torque signal is observed to be plausible.

3. The electric power assisted steering apparatus according to claim 2 in which the motor control circuit is adapted to generate a control signal having a value which is dependent upon the value of the second torque signal, if the first and second torque signals are not consistent with each other and only the second torque signal is plausible.

4. The electric power assisted steering apparatus according to claim 2 in which the torque channel selector is adapted to generate a control signal having a value of zero or indicative of an error, if the torque channel selector observes that the first and second torque signals, generated by the first and second angular position sensors respectively, are neither consistent with each other nor plausible.

5. The electric power assisted steering apparatus according to claim 1 in which the error determining circuit for the first torque signal indicates that the first torque signal is in error when the value of the first torque signal is detected to be either absent or out of a predetermined range of expected values.

6. The electric power assisted steering apparatus according to claim 1 in which the error determining circuit for the second torque signal indicates that the second torque signal is in error when the value of the torque signal is detected to be either absent or out of range of expected values.

7. The electric power assisted steering apparatus according to claim 1 in which the torque channel selector in use only selects a channel when the plausibility of the channel is observed to be plausible and there is no torque channel error for that channel.

8. The electric power assisted steering apparatus according to claim 1 in which the torque plausibility estimator for each sensor circuit determines that a torque signal is plausible by observing one or more additional signals obtained from a part of the torque sensor or from one or more additional sensors that monitor a part of the steering system.

9. The electric power assisted steering apparatus according to claim 8 which includes a secondary angular position sensor for determining the torque that is independent, or partially independent, of the two torque signals and the torque plausibility estimator is arranged to determine the plausibility of a torque signal by comparing the torque signal with the torque estimated by the secondary angular position sensor.

10. The electric power assisted steering apparatus according to claim 8 which further includes a cross checker circuit that produces a crosscheck signal indicative of any difference between the two torque values, the torque channel selector additionally observing the output of the crosscheck diagnostic channel when selecting which if any of the torque signals is to be selected for use by the motor control circuit.

11. The electric power assisted steering apparatus according to claim 10 in which the cross checker circuit generates a crosscheck signal indicating a crosscheck error when the torque signals output from the first and second sensor circuits are found to differ by more than a predetermined amount.

12. The electric power assisted steering apparatus according to claim 1 further including a motor position sensor configured to output a motor position signal indicative of the position of the electric motor, the motor position signal being used by the torque plausibility estimator to determine the plausibility of the first and second torque signals.

\* \* \* \* \*